Oct. 29, 1935.　　　　　S. J. ERLING　　　　　2,018,713
MILKING MACHINE PULSATOR
Filed Feb. 23, 1934
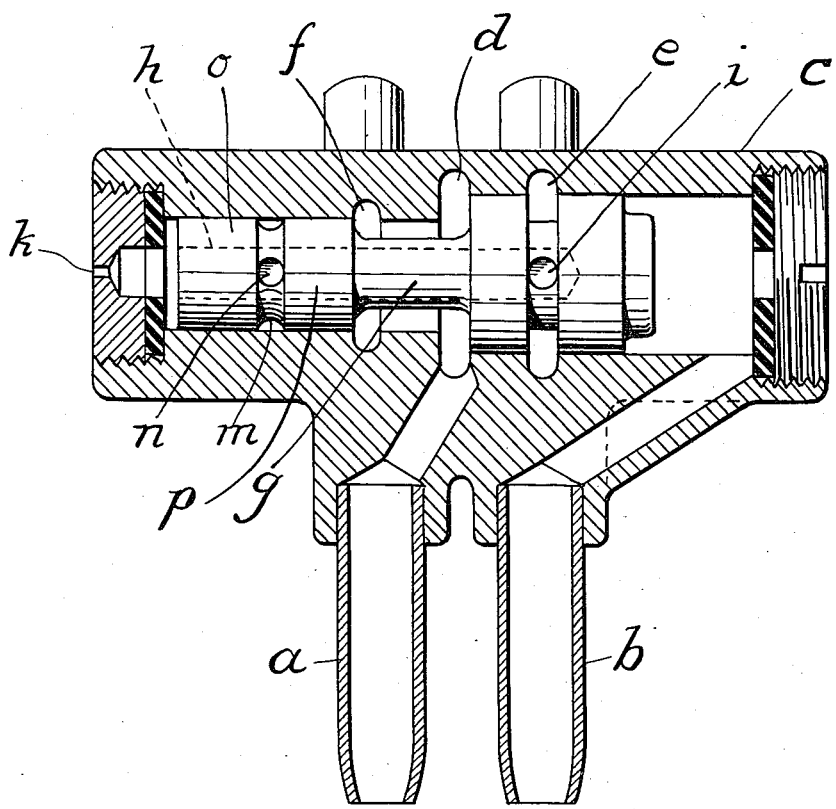
WITNESS:
INVENTOR
Sven Johan Erling
BY
ATTORNEYS.

Patented Oct. 29, 1935

2,018,713

UNITED STATES PATENT OFFICE 2,018,713

MILKING MACHINE PULSATOR

Sven Johan Erling, Nockeby, Sweden, assignor to The De Laval Separator Company, New York, N. Y., a corporation of New Jersey Application February 23, 1934, Serial No. 712,667
In Sweden February 23, 1933

1 Claim. (Cl. 31—63)

My invention relates to that type of secondary pneumatic pulsators, such, for example, as is disclosed in the Leitch Patent No. 1,255,186, February 5, 1918, which is particularly adapted for use with teat cups having an inner milk chamber which is applied to the teat and an outer or inflation chamber which receives pneumatic pulsations, usually by connecting the same alternately with atmosphere and with a partial vacuum. The secondary pneumatic pulsator comprises a valve having an end of smaller diameter open to the atmosphere and an end of larger diameter in constant communication with a source of pneumatic pulsations, whereby the valve is reciprocated. In its reciprocations it connects tubes leading to the inflation chambers of the teat cups alternately with a source of partial vacuum and with the atmospheric port in the smaller diameter end of the valve housing. Usually the arrangement is such that each of a pair of teat cups is connected with atmosphere simultaneously with the connection of the other pair of teat cups with vacuum. The tubes leading to one pair of outer teat cup chambers connects with the larger diameter part of the pulsator; the tubes leading to the other pair of outer teat cup chambers connects with the smaller diameter part of the pulsator.

In such secondary pneumatic pulsators the smaller diameter end of the piston valve that communicates with the atmosphere is exposed to greater wear than the larger diameter end, the greater wear being due to the entry through the end atmospheric port of dust and abrasive impurities. When the smaller diameter end of the piston valve becomes worn, leakage of air occurs around the smaller diameter end of the valve. Consequently, when the pair of outer teat cup chambers opening into the smaller end of the valve chamber is being evacuated, the leakage of air is sufficient to cause a lower vacuum in this pair of teat cup chambers than is produced in the other pair of teat cup chambers when they are being evacuated.

Although this defective operation has been recognized for many years, the objection has never been overcome. It is the object of my invention to remedy this defect. The object is accomplished by the construction disclosed in the accompanying drawing, the single figure of which is a longitudinal sectional view of a secondary pneumatic pulsator embodying the invention.

The valve casing c comprises a valve chamber having ends of different diameters. The larger diameter end has a port connecting it with a nozzle b to which is attachable a hose or tube connected with a source of pneumatic pulsations, not shown. The smaller diameter end has a small atmospheric port k. The valve chamber is provided with internal circumferential grooves d, e and f. Groove d, at the junction of the larger and smaller diameter portions of the valve casing communicates with a nozzle a connected with a source of partial vacuum. Groove e in the larger diameter portion of the valve chamber is in constant communication with the outer chambers of one pair of teat cups (not shown). Groove f in the smaller diameter portion of the valve chamber is in contant communication with the outer chambers of the other pair of teat cups (not shown).

The pulsator valve g has end heads of different diameters adapted to the different diameter ends of the valve housing and a neck of still smaller diameter connecting the end heads. From the smaller diameter end of the valve extends an axial passage h at the end of which is a radial port i. The construction above described is old except that the small diameter head is considerably elongated and is provided with a circumferential groove m between its ends and with a radial port n connecting passage g and groove m.

The valve is shifted to the position shown in the drawing when nozzle b is connected with the atmosphere, and air from port i flows into groove e and thence to the outer chambers of one pair of teat cups. At the same time air from the outer chambers of the other pair of teat cups is exhausted through groove f and nozzle a. When nozzle b is connected with vacuum, the valve is shifted to the right; and air from port n flows through groove f to the second named pair of teat cups, while air is exhausted from the first named pair of teat cups through groove e and nozzle a.

The cylindrical surface o of that part of the small head of the valve between the end thereof open to the atmosphere and groove m provides an extra wearing surface which carries the valve and reduces the wear at the sealing surface. Between the chamber surrounding the neck of the valve and the groove m there is a constant difference in pressure but no such pressure difference exists between the groove m and the atmospheric port k, both being in constant communication with the atmosphere. As the surface o has a rather great extension in radial direction, it affords, together with the surface p, which is the sealing surface, a much greater resistance to wear than would be the case if there were but one surface $p$, even though surface $p$ should be considerably elongated. By providing the extra surface $o$, separated from surface $p$ by a groove constantly communicating with the atmosphere, the sealing properties of the valve are therefore considerably increased, leakage of air into the chamber surrounding the valve neck is prevented or very substantially reduced and the life of the pulsator is much prolonged.

What I claim and desire to protect by Letters Patent is:

A pulsator for milking machines comprising a valve chamber having ends of different diameters and provided with a vacuum port communicating with its larger end, an atmospheric port communicating with its smaller end and grooves adapted for connection with the pulsation chambers of different pairs of teat cups; and a valve, having end heads of different diameters, reciprocable in said valve chamber and provided with a passage extending axially from its smaller extremity and holes extending from said passage to the cylindrical surfaces of the larger and smaller valve heads respectively, the smaller end head being of substantial length and provided between its ends with an arcuate groove with which said hole in the smaller end head registers, the groove so positioned thereby dividing the smaller diameter head of the valve into a separate sealing surface and a separate wearing surface, thereby minimizing leakage of atmospheric air and prolonging the life of the pulsator.

SVEN JOHAN ERLING.